US008050686B1

(12) United States Patent
Souissi et al.

(10) Patent No.: US 8,050,686 B1
(45) Date of Patent: Nov. 1, 2011

(54) METHOD OF ENABLING LOW TIER LOCATION APPLICATIONS

(75) Inventors: Slim Souissi, San Diego, CA (US); Gerald J. Gutowski, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1187 days.

(21) Appl. No.: 09/651,382

(22) Filed: Aug. 29, 2000

(51) Int. Cl.
 *H04W 24/00* (2009.01)
(52) U.S. Cl. ............... 455/456.1; 455/456.5; 455/67.11; 455/458
(58) Field of Classification Search ............... 455/456.1, 455/456.3, 456.6, 458, 69, 517, 515, 67.11, 455/550.1, 126, 456.5
 See application file for complete search history.

(56) References Cited

U.S. PATENT DOCUMENTS

| | | | | | |
|---|---|---|---|---|---|
| 4,972,456 | A | * | 11/1990 | Kaczmarek | 455/436 |
| 5,642,398 | A | * | 6/1997 | Tiedemann, Jr. | 455/426 |
| 5,724,660 | A | * | 3/1998 | Kauser et al. | 342/451 |
| 5,815,814 | A | * | 9/1998 | Dennison | 455/456 |
| 6,052,597 | A | * | 4/2000 | Ekstrom | 455/456 |
| 6,064,339 | A | * | 5/2000 | Wax et al. | 342/417 |
| 6,070,078 | A | * | 5/2000 | Camp et al. | 455/456.2 |
| 6,111,538 | A | * | 8/2000 | Schuchman | 342/357 |
| 6,249,245 | B1 | * | 6/2001 | Watters | 342/357.03 |
| 6,266,014 | B1 | * | 7/2001 | Fattouche | 342/450 |
| 6,289,280 | B1 | * | 9/2001 | Fernandez-Corbaton | 701/214 |
| 6,321,092 | B1 | * | 11/2001 | Fitch et al. | 455/456 |
| 6,330,452 | B1 | * | 12/2001 | Fattouche et al. | 342/457 |
| 6,865,395 | B2 | | 3/2005 | Riley | |
| 7,126,527 | B1 | * | 10/2006 | Bajikar | 342/357.27 |
| 2002/0165645 | A1 | * | 11/2002 | Kageyama | 701/1 |

* cited by examiner

*Primary Examiner* — John J Lee
(74) *Attorney, Agent, or Firm* — Roland K. Bowler, II; Stephen H. Shaw (57) ABSTRACT

In a wireless communication network having remote receivers (subscriber units) communicating through base units in a service area, each of the base units servicing a cell area encompasses one or more identifiable zones which can be occupied by receivers. According to the invention, at least one measure of the spatial size of the cell is reported to a receiver communicating with a base station, for use in location specific applications. The measure can be a size category, an average diameter or another measure, such as a shape and orientation of the cell, a boundary apex, and a boundary line of the cell. The base station coordinates are conventionally available to the receiver. By providing a measure of size, the receiver can resolve its zone or location to a coarse or low level of resolution. The zone occupied by the receiver is at least within the cell and the size of the cell and location of the base station are now known. According to additional embodiments, the resolved zone known to be occupied by the receiver is refined to an area within the defined cell area. The size of the cell or service area of the location transmitter can be appended to the identification code of the base station. Reporting the cell size and location is sufficient to facilitate some location applications in the receiver, and can reduce or eliminate reliance on satellite and other positioning systems, particularly if the zone initially defined as the cell size is resolved further, for example using time-of-arrival, power level, angular bearing and similar techniques.

9 Claims, 3 Drawing Sheets

METHOD OF ENABLING LOW TIER LOCATION APPLICATIONS

FIELD OF THE INVENTION

The invention relates to providing location information for wireless subscriber units in a communications network, for example a cellular telephone system or other network. In particular, one or more dimensions of a zone that a subscriber unit is known to occupy, is determined and made available by communicating with the subscriber unit

BACKGROUND OF THE INVENTION

There are various applications in which it is useful for a movable communications unit or its user to know the location of the unit, such as its coordinates in latitude and longitude or other reference system. Locating a person in need, helping a user to find a desired location such as a business, tracking assets during shipment, and locating stolen vehicles, are examples. Depending on the situation, the location information might be used at the subscriber unit or at the base station or at another unit in the network.

The Telecommunication Industry Association (TIA) has adopted wireless location services standard, IS-801, to enable carriers and manufacturers to deploy "Wireless Assisted GPS" technology for mobile telephones and other radio communication tools to pinpoint locations automatically. The E911 standard of the US Federal Communications Commission suggests that location should be determinable to an accuracy of 100 meters with a network solution or 50 meters with a handset solution, for at least 67% of the attempts, and to an accuracy of 300 meters (network) or 150 meters (handset) for 95% of attempts.

Different location determination technologies are available. Differences in the time at which a signal from a source arrives at two or more spaced antenna elements can determine a relative bearing of the source. At a single receiving antenna, the timing of synchronized signals from two or more spaced remote signal sources of known coordinates, can fix the coordinates of the antenna.

The global positioning system (GPS) is a location determination system that uses 24 satellites transmitting synchronized signals on two frequency bands according to a code modulation technique that enables a mobile receiver to discriminate the timing signals from multiple satellites at known positions. The GPS location technique may be accurate but require an investment in hardware and require processing capabilities at the receiver, thus increasing the receiver cost and size or reducing battery life.

Different uses are possible if a receiver such as a cell phone "knows" its spatial coordinates to a degree of accuracy that is comparable to the precision of the information to which the receiver's coordinates are to be compared. Traffic hazard or weather information may be stated with a tolerance of some miles. Address mapping information is precise to the distance between adjacent addresses. If a receiver is to use these types of information, its location must be known at least to a comparable level of precision.

In a cellular wireless telephone network or a similar arrangement, the coordinates of a base station are fixed. It is known for the base station to broadcast its coordinates as a part of the base station header information. This information is therefore made available to subscriber units that communicate with the base station, and typically are located in the service area adjacent to the base station (namely the base station's "cell").

The coordinate location of the base station may be known in this manner, but the base station coordinates are not useful to the subscriber units except in connection with techniques for switching from service by one base station to another. The subscriber unit might assume that it is somewhere in the vicinity of a base station with which the subscriber unit is communicating, but according to conventional systems cannot determine the size of the cell that is serviced by the base station. It would be advantageous if the known coordinate location of the base station could provide some assistance to mobile units that seek to resolve their location.

SUMMARY OF THE INVENTION

The present invention permits a mobile unit, or a base station or other unit that communicates with the mobile unit, to obtain information that assists in resolving the location of the mobile unit and thereby relieves requirements for access to other location resolving infrastructure and data processing requirements. In particular, the mobile unit is provided with information that defines the size of the cell serviced by the base station with which the mobile unit communicates.

The present invention provides additional information permitting the location of the mobile unit to be refined by potentially coarse limitations on the possible locations of the mobile unit, which limitations are made available to the mobile unit by one or more of several techniques. These techniques include angular bearing measurements, distance measurements based on relative power levels, potentially combined with logical groupings of subsets of subscriber units.

In one embodiment, the resolution with which a coordinate location is resolved in a locating system is made available to the mobile unit so as to define a zone that encompasses the coordinate location and an adjacent zone or error equal to the resolution with which the location is resolved.

Generally it is an object to determine a "zone," namely an identifiable space or area, which a mobile unit is known to occupy. The zone can be defined in an exclusive or inclusive sense. The zone can be defined logically and/or spatially. Two or more spatial definitions as well as logical distinctions among mobile units can further refine the location of a given mobile unit. The zone as thereby defined can be stationary or can be redefined from time to time. The zone can be centered on a reference point such as the base station, a mobile unit or another point. It can have regular or irregular boundaries. A given transmitter, receiver or place can be in any number of zones, depending on how they are defined. By using these zones and Boolean combinations of zones, the location of a mobile receiver is determined to a level of precision that is comparable to the location related application or function that is intended, such as finding a mobile unit, directing the user of a mobile unit to a given coordinate location or the like.

Alternatively, the mobile unit may employ zone location information to reduce its reliance on more demanding location resolution systems (or arguably enhance performance of such systems), such as GPS. For example, if the mobile unit can resolve its location to a particular zone (such as a cellular service area of a known radius and a known base station coordinate location), then it may be possible selectively to eliminate some possible coordinate locations that otherwise are solutions to a GPS location calculation. In that way, the location of the mobile unit may be resolved to a resolution approaching the GPS resolution, without employing all the satellite signals or processing requirements that would normally be required to resolve the location using only GPS access.

The invention thus can improve the efficiency and functionality of many mobile receiver applications. The mobile receiver preferably can determine from communications with a base station, at least some information as to the dimensions or boundaries of the base station's cell. The size of the cell can be at least as important as the coordinates of the base station in determining the location of the mobile unit.

BRIEF DESCRIPTION OF THE DRAWINGS

These and other features, aspects, and advantages of the present invention will become more fully apparent from the following description, appended claims, and accompanying drawings in which:

DETAILED DESCRIPTION OF THE PREFERRED EMBODIMENT

Referring to FIGS. 1-4, preferred embodiment of the invention can be advantageously employed in a wireless communication network having distributed base stations that service wireless devices in service areas or cells. Typically the wireless devices are cellular telephones, but they can be of any type, including for example, personal digital assistants, vehicle communication systems, local or personal area networks such as Bluetooth, or the like.

Figure 1:
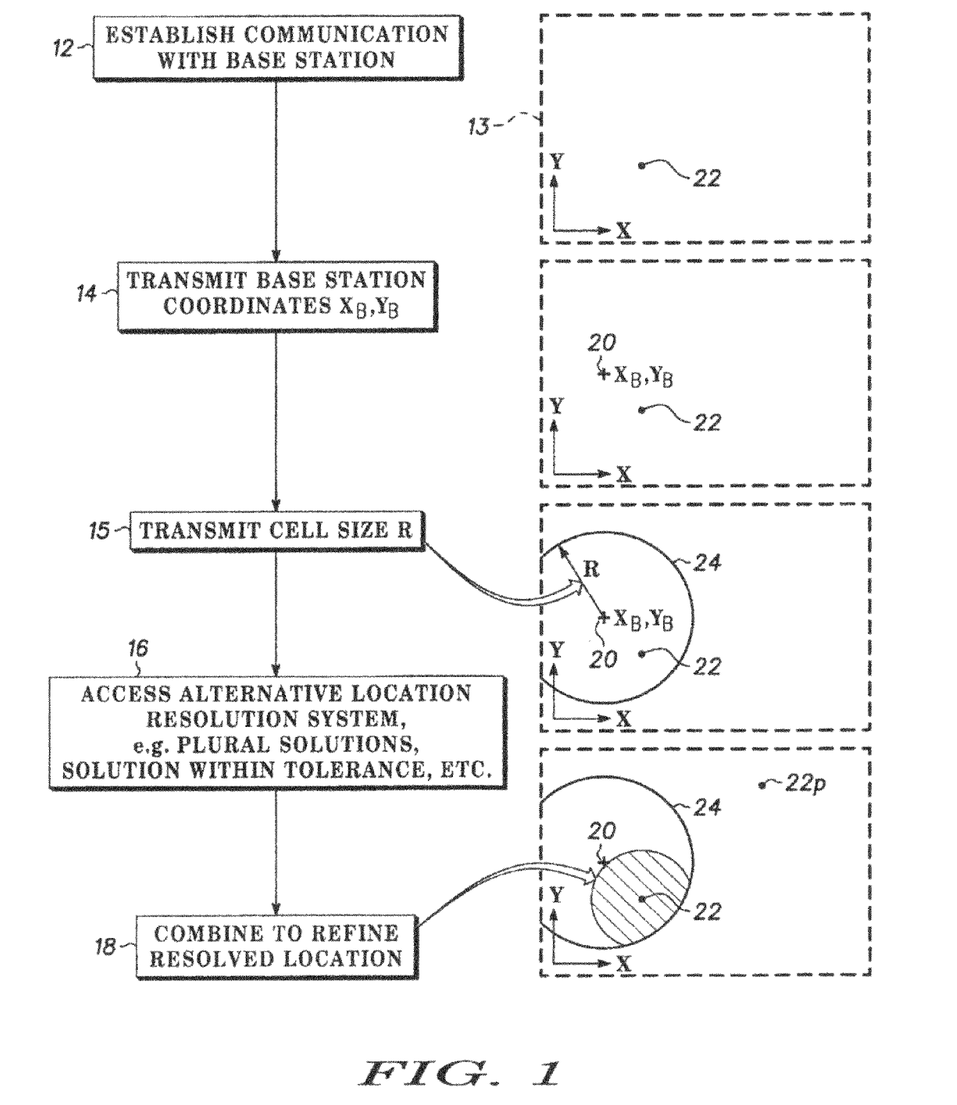
FIG. 1 is a flow chart representing steps undertaken in resolving the location of a mobile unit or other communication device according to the invention.
Figure 2:
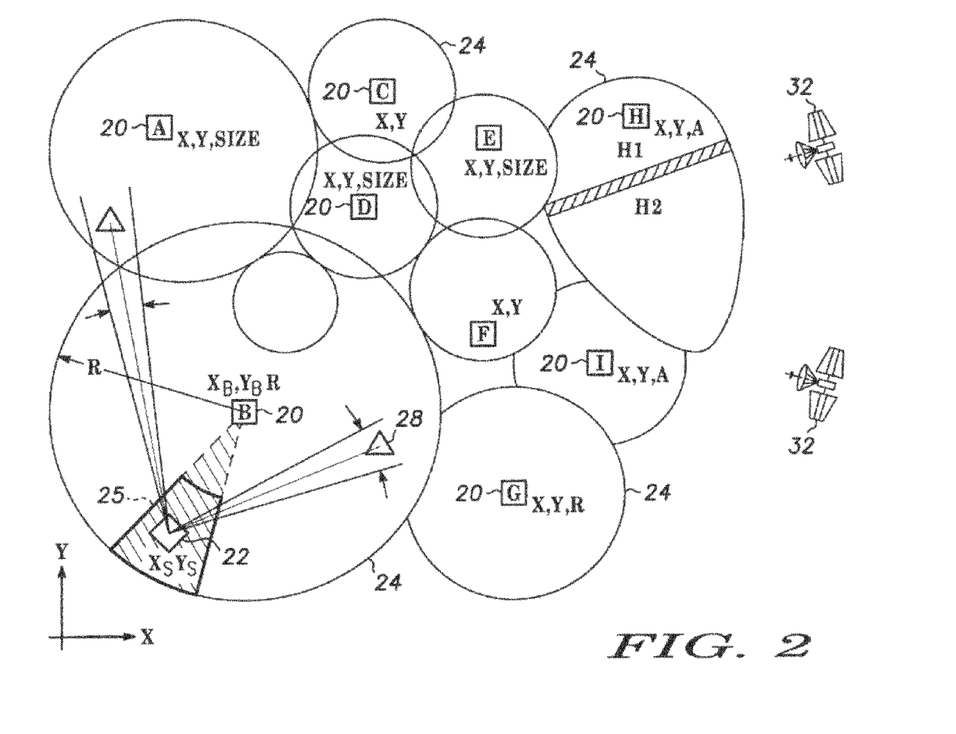
FIG. 2 is a plan view of an area of a communications network for discussion of an embodiment in accordance with the invention.

FIG. 1 illustrates a series of steps according to the invention, and FIG. 2 shows the implications and benefits in certain particular situations. The base stations 20 are indicated by square symbols in FIG. 2 and are designated A through I. The wireless devices 22 (indicated by diamond symbols) operate any of various applications programs, alone or in conjunction with their users. The applications of interest concern the spatial location of the wireless devices or subscriber units 22, in their respective service areas or cells 24.

A variety of location applications programs are possible. The precision that a location application may need to achieve its functions varies among applications. For example, a subscriber unit 22 may simply determine its latitude and longitude and read out coordinates for the use of its user, e.g., to compare with coordinates on a map. The unit 22 might also employ its coordinates or other location specifying information to process other data selectively. For example the unit 22 might be operable to direct the user from the detected location to a known coordinate location such as a destination address. The unit 22 might select or sort information due to proximity with a detected location. The invention is applicable to any such application.

FIG. 1 shows the basic steps involved. At stop 12, communications are established between a subscriber device 22 at an unknown location in a universe shown by dotted lines, and a base station. The subscriber device 22 and the base station are physically located at some position in the universe, which can be specified according to an arbitrary coordinate system X-Y. Specific coordinates used can be in the same coordinate system or a coordinate system that can be cross-referenced to space X-Y.

It is assumed that the location of the base station is fixed and that the coordinates of the base station are known. The coordinates of base stations are conventionally contained in information provided by the base station. The coordinates can be broadcast or transmitted in preliminary header information as a step in establishing communications with a subscriber unit.

Alternatively, the coordinates of the base station can be available in a database accessible from the subscriber unit 22, wherein coordinate information is indexed to a base station identifying code that is transmitted by the base station. In FIG. 1, at step 14, the base station coordinate information is provided to the subscriber unit 22 by such a technique. This locates the base station at coordinate location $X_B, Y_B$ in space X-Y.

A mobile subscriber unit 22 which communicates with the base station is necessarily in the service area of the base station, presumably somewhere in a zone adjacent to the base station. Service area or cell sizes vary widely in size and shape. According to an inventive aspect, at least one dimension of the cell is transmitted to the subscriber unit at step 15 such that the applications programming of the subscriber unit 22 is informed of both the location of the base station and the size of the cell that the base station serves. This information is a coarse specification of the location of subscriber unit 22, which can be employed in location specific functions of the applications programming.

In the example shown in FIG. 1, the service area or cell 24 is circular and centered on base station 20. Accordingly, the service area 24 is accurately defined by specifying the center coordinates $X_B, Y_B$ and the radius R. In the absence of information defining the cell size, the center coordinate information $X_B, Y_B$ is not very helpful to determine a location of the subscriber unit 22. The applications in the subscriber unit may reasonably conclude that the unit is "near" the base station because the subscriber unit is communicating through the base station. But the cell may be of any size within orders of magnitude, so there is no measure or possible assumption of how near the subscriber unit might be. Cell sizes vary quite widely from small urban or even institutional areas measured in meters, to large rural cells measured in kilometers. Any given subscriber unit 22 might find itself in any of the cells. This problem is solved according to the invention because communications with a base station provide a measure of the cell size for that base station, or at least enable the subscriber unit to determine the cell size.

The cells 24 are normally areas adjacent to each respective base station 20. In a typical embodiment, the base stations 20 are stationary and the wireless devices 22 are mobile or at least are located at indefinite locations. The wireless devices 22 could be personally carried hand-held devices or could be mounted in vehicles, etc.

The locations of the base stations 20 and the wireless devices 22 can be identified by coordinate positions according to some arbitrary coordinate system that can be Cartesian or polar or spherical, etc. Likewise, any units of measure can be employed. For simplicity of this description, the preferred embodiment is described primarily with reference to an example where the locations are defined in a flat horizontal plane on the earth, and the coordinates are related to an arbitrary origin as shown in FIG. 1, which could be latitude/longitude or a similar system. This invention is applicable to other types of zones that might be defined. A zone could be a span along a line in one dimension (such as the intersection of lines or a distance along a road) or a volume in three dimensions. The definition of a zone can also contain logical criteria in addition to spatial limitations, which criteria distinguish occupants of the zone (members of a group) as a distinct group distinguished from non-occupants (non-members).

One or more of the base stations 20 could be mobile, like the wireless devices 22 in the example. However preferably the sizes of areas of the service areas or cells 20 served by at least some of the base stations, and preferably the size of each of the cells 20, are known and are made available to the programmed processors of the wireless devices 22 for use in executing their programmed instructions. Cell sizes and similar location specifying information can be more or less definite. A definite size and location are provided, for example, by stating center coordinates and a radius. Another example of a definite size and location is provided by stating the coordinates of apices of a polygon defining the service area. Less definite definitions of the size and location of a service area are also within the scope of the invention. For example, the coordinates of the base station and a generic measure of the cell size can be provided, such as "small," "medium" and "large," where these measures refer to particular ranges of cell sizes. An indefinite or coarse definition of the cell is likewise useful in certain location specific functions that can be embodied in applications programs in the subscriber units 22.

In FIG. 1, the specification of coordinates $X_B$, $Y_B$ and radius R in steps 14, 15, effectively define area 24, which is known to be occupied by subscriber unit 22. Location specific information relating to area 24 can be selected by applications operating in subscriber unit 22. Location specific information for other portions of the X-Y universe can be ignored or processed differently or otherwise handled as appropriate to the application.

Information defining the cell size can be employed alone or in conjunction with additional location information. At step 16 in FIG. 1, subscriber unit 22 accesses an alternative location resolution system to determine its location with some degree of precision. The alternative location resolution system can be based on any detectable criteria, such as the angular bearing or time of arrival of signals from various sources, which permit the subscriber unit 22 to determine that it is included in a particular area. In FIG. 1, for example, the subscriber unit could determine from the power level of signals received from base station 20 that the distance between the subscriber unit and the base station is equal to the radius of the shaded circle around subscriber unit 22. At step 18, the subscriber unit combines the known cell size and location, namely a circle of radius R around coordinate position X, Y, with this alternative location information, localizing the subscriber unit more precisely as within the shaded area shown.

With reference to FIG. 2, the "universe" of coordinate system X-Y may contain any number of service areas or cells 24 of different sizes and shapes, delineated by lines in the drawing. A subscriber unit 22 that establishes communications over a base station 20 determines the location of the base station it is using from communications with the base station. According to the invention the communications include at least one measure of the size of the corresponding service area 24.

In FIG. 2, a subscriber unit 22 in cell B determines from communications with the respective base station 20 that base station 20 is located at location $X_B$, $Y_B$. At least one measure of cell size is provided, which in FIG. 2 can be a cell radius R. According to FIG. 3, the measure of cell size may alternatively be a cell size category, such as small, medium or large, which a location application in unit 22 can meaningfully interpret as equating to a particular dimensional range.

By Boolean combinations of criteria including spatial information defining a zone (the location and size), plus other logical criteria that are met by a subset of all subscriber units, the zone of interest can be refined to include only certain ones of the receivers or subscriber units that occupy the defined spatial area. The size of the zone is determined by the receiver. The occupants or subscriber units located in the zone are limited to those that meet the criteria, defining another refinement of the zone.

In a simplest example, the zone of the receiver 22 is equal to the cell size serviced by the base unit 20 and includes all the receivers in the cell. The size of the zone can be reported in a communication from the base station to the subscriber unit, or can be a prerecorded attribute that is cross referenced to a code identifying the base station that is transmitted by the base unit. Typically, the base unit announces its unique identification code in parameter information that is sent from the base unit to the receiver when initiating communications. According to the invention, this parameter information includes a measure of the size of the cell. The size of the cell can be communicated by reporting at least one dimension of the cell to the receiver as a part of the cell identification parameters.

According to another embodiment; the zone occupied by the receiver need not be defined entirely as the cell serviced by the base unit with which the receiver is communicating. As discussed above, it is advantageous to localize the receiver to a zone that is smaller than the communicating base unit cell. It is also possible to locate a receiver in a zone that is larger than the cell of the base unit or to use information from another base station, such as angular bearing and/or power level, to define a spatial zone occupied by the subscriber unit.

Referring to FIG. 2, subscriber unit 22 communicates with base station 20 of cell B. Cell B reports the size of its service area in communications with subscriber unit 22, such as the radius R of the cell from the base station. This localizes subscriber unit 22 in cell 24. The bearing between the base station 20 of cell B and subscriber unit 22 can refine the location to an angular segment 25 of cell B as shown. The angular width can be determined at the subscriber unit, for example, by receiving the information from the base station or be accessed as pre-programmed into the subscriber and correlated to the base station or be a function of subscriber unit parameters. If the base station broadcasts, bearing angular width information, the general notion is that if a subscriber unit receives the message it will then know the bearing and width of this signal and this information together with cell radius can help resolve the receiver location. If additional reference signals can be acquired, such as angular bearing, time-of-arrival or power level measurements from sources such as the base stations of other cells, one or more fixed transmitters 28 or other transmitters at known locations (e.g., GPS satellites 32), information obtained from such source serves to better refine and improve the precision of the location definition available to subscriber unit 22. The fixed transmitters 28 can be within the cell or in another cell. The information obtained can be bearing information, power level, differences in time of arrival or other information. Insofar as the information has an inherent measurement error, the error can be converted to a spatial equivalent and interpreted as an area having given dimensions. Thus the location is refined and the precision of location information is improved.

The invention is applicable to various location dependent applications. Determining the location of the receiver 22 is one such location dependent application. Known information about one or more of the sending or receiving devices (receiver 22, base station 20, sources 28, satellites 32 and/or other base stations $20_A$ through $20_F$) permits the other devices to infer the location of others of the sending or receiving devices, and in particular to resolve the coordinate location of a mobile subscriber unit 22. The known size of the communicating base station cell provides a useful limit on the location of the subscriber unit, namely to a location within the perimeters of the cell. Insofar as directional antennas, power level detectors, timing comparison devices or the like (not shown) are available to the subscriber unit 22, the base station 20 or any additional devices whose transmissions can be received, the location information is refined to a greater degree of precision.

The information can be static information or can be dynamic. For example, fixed location coordinates or power levels can be known from stored databases, or regularly transmitted header data. Alternatively the pertinent information can be transmitted upon request, for example by access over the network to a stored database. Furthermore, the information can be discerned in part by instructing the communicating device (e.g., subscriber unit 22) to alter its transmission, such as its power level or frequency. Measurements using one of the communicating devices enable the receiver or the base station to discern information about the other device's location. If the location of either device is at least partly known, the discerned information assists in defining the location of the other device.

Information describing the signal sources may be measured, already known or can be determinable from network communications. For example, if the base station has a directional antenna, the base station may report pertinent information enabling the subscriber unit to refine its location parameters. In an example according to FIG. 2, the base station 20 of cell B has known coordinates $X_B$, $Y_B$. According to the invention the base station reports its cell size, for example by further reporting radius R. The subscriber unit is thus localized to a defined area, namely the area of cell B. If either the base station or the subscriber unit has a directional antenna, the bearing from the base station to the subscriber unit can be known, within a given angular tolerance as earlier noted by information from the station or otherwise. This localizes receiver 22 to an angular sector 25, shown shaded in FIG. 2. If either the base station or the subscriber unit can discern distance by power level measurements or time of arrival measurements, the location of the receiver can be further refined, for example to the angular and radial span 25 shown in heavy lines in FIG. 2.

Referring to FIG. 1, determining the location of the receiver 22 advantageously employs a coarse location definition provided by reporting the cell size to the subscriber unit 22. This information in addition to the base station coordinates provides either a location specification (i.e., the cell area) or defines perimeters that refine information obtained from communications with other sources 28 that have known or identifiable locations from which a bearing or distance measurement can be made to some level of precision. The other sources 28 can be part of the same communication network by which receiver 22 communicates, or may be external sources. For example, such supplemental signal sources can include one or more global positioning system satellites 32. The supplemental sources 28 can be coarse or fine measurement sources. However, it is advantageous to use the coarse information obtained according to the invention to reduce dependence on potentially processor or battery capacity demanding precise location definition systems, such as the global positioning system. For example, while four or more GPS satellites may have to be monitored to obtain precise location information, using supplemental sources such as cell site size or baring information can reduce the number of satellites being monitored to two or less for similar location precision.

According to an additional inventive technique, the zone occupied by receiver 22 can be defined in part by the perimeters of predetermined spatial zones having determinable boundaries, and in part by other distinct membership criteria other than location.

Figure 3:
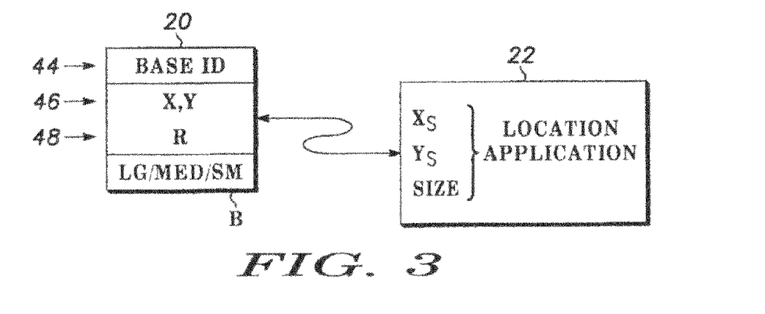
FIG. 3 is a block diagram showing certain data values reported from a base station to a wireless device and employed in operation of a location application in accordance with the present invention.

FIG. 3 is a block diagram showing, preferably, the data values made available to the corresponding communication units according to the invention, namely base station 20 and receiver 22. The base station 20 is defined by prerecorded location information 46 and a size 48. Preferably the base station is also provided with an identification code 44, and in an embodiment using cross referenced database information the identification code can be used to determine the location and size information 46, 48, as opposed to storage or reporting of such information by the base station 20.

The cell size can comprise a numeric measure, for example a cell radius "R" in meters or kilometers, etc. in the example of a circular cell. The cell size can also be defined wholly or partly in other measures, such as the average diameter of an irregularly shaped cell, or the coordinates of apices of a polygon. Alternatively, the size can be stored and indicated according to a relative size hierarchy, e.g., small, medium, large, extra-large, etc. In the case of a relative size hierarchy, the programmed processor(s) using the information to accomplish the purpose of the application preferably has stored constants that render the categorization useful by equating the possible relative size categories to units of measure that can be applied to a coordinate system. A specific example of hierarchical size categorization is discussed below with reference to Table I.

According to another aspect, the reported cell size can be generally subdivided into discrete zones to better localize the subscriber unit 22. In the embodiment shown in FIG. 2, cell "H" has a known boundary subdividing the cell area into zones H1 and H2. Similar distinctions can be made if the information defining the zone is known to include a given point location or is known to have a certain shape and possibly orientation or is known to have a fixed or defined moving boundary. The category information or the corresponding size according to the units of measure dimensions of sectors that qualify for inclusion in these categories of sizes can be programmed into the receiver or other subscriber unit, or can be signaled from the base units to their subscribers to define the size of each cell, which in that case defines a location zone in which the receiver is located.

If a location system senses distance from a single source location, for example using the transit time of a signal or the received power level (versus known transmission power level) as the sensed parameter, the three-dimensional solution is a sphere having a given radius from the fixed location. In two dimensions a single-source solution may be a circle at the given radius in a plane. Either case can be within a tolerance that can be interpreted as an annulus. If there are two spaced source locations, the solution is the intersection of two spheres in three dimensions (which is a circle) or two spaced points in two dimensions. To resolve a location, a typical location system senses distance from three or more known source locations, to resolve the location solution to one point. According to the invention, the coarse location definition provided by the cell size or other location determinations as discussed, may eliminate one or more solutions, and thereby render it possible to resolve location to a point even using two sources rather than three. In FIG. 1, for example, if two solutions 22 and 22*p* are provided, it is possible by knowing the cell size to remove point 22*p* as a possible solution.

There are various situations in which location information may be helpful to a user of a mobile receiver. The FCC has proposed a standard for extended emergency telephone service (E911) in which mobile telephones can access a location determination system and automatically report their coordinates in a location system when a call is made for emergency services. There are mobile location applications associated with mapping, such as indicating the present position of a vehicle on a map grid projected on a vehicle display. Mapping applications that are presently functional on the internet can cross reference the location of a particular street address to its coordinates on a map, and by comparing the present location of a mobile receiver to such coordinates one can guide the user to a particular address. Such a system can be logically extended to guiding the user to a number of addresses of establishments chosen in a certain way, for example guiding the user to the nearest restaurant, convenience store or hospital. The invention is applicable to many such applications.

Reliance on communication, processing, memory and other capabilities that might be needed to resolve a location to the accuracy of a very precise location system such as GPS, is reduced or eliminated according to the invention. This is possible according to the invention without extensive changes to existing communications techniques, by including the cell size in the information reported by base stations to mobile units whose communications are handled.

Base units can serve cells of various sizes. In a rural area, a single base station serving mobile telephones, vehicle communications and wireless data applications may serve a cell having a radius of tens of kilometers. A typical cell size for a moderately populated area is on the order of 5 km across. In some situations, for example when monitoring user-carried data capture equipment for warehouse pick-and-place applications, a cell may be only a few meters in diameter.

For convenience, this disclosure generally describes a cell or service area of a base station or a location transmitter as being a discrete area having dimensions defined by definite spatial boundaries and being exclusive of other cells. In reality, it is possible for various reasons including signal strength, directionality, local obstructions and other factors, that a receiver located relatively closer to one base station may actually communicate through a relatively more distant base station than other receivers that are located nearby. In general, a cell or service area can be considered that area in which most of the receivers communicate through a given base station. For receivers that are near boundaries, various hand off and overlay/underlay or hand-down/hand-up procedures are known that enable a receiver to be switched from one base station to another. For simplicity in this disclosure, base station service areas are presumed to be discrete and substantially abutting. Similarly, location systems comprising beacons or the like that can provide distance information or provide a bearing (or permit a receiver to take a bearing), are presumed to encompass some service area, but the service area of a location transmitter need not correspond to any base station service area. The location service area may correspond to a service area or may overlap base station service area boundaries, and may be larger or smaller than a base station service area or defined by the area of overlap of cells, and thereby encompass more than one cell or less than all of a single cell.

Figure 4:
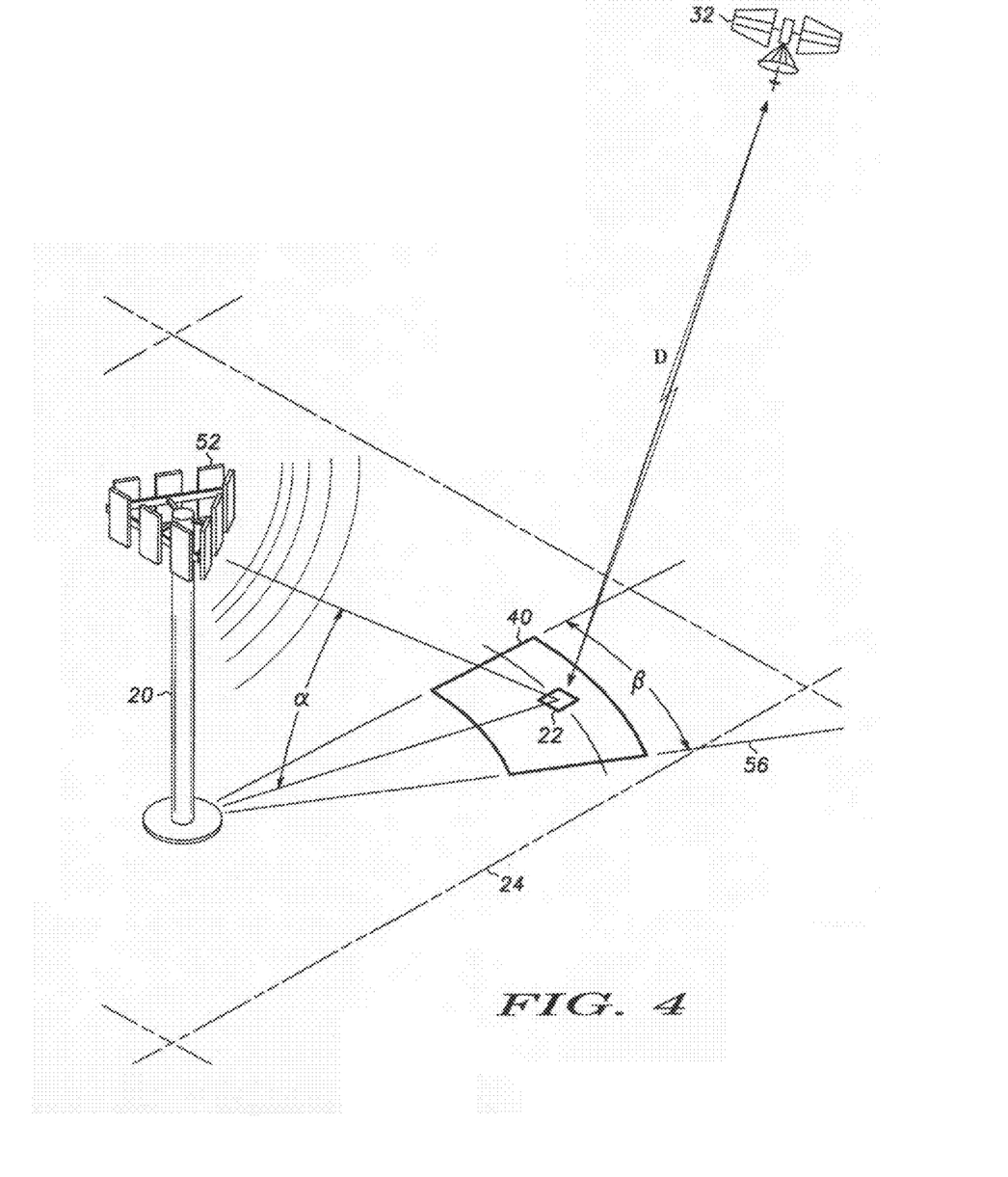
FIG. 4 is a physical illustration, not to scale, showing an application of the invention.

FIG. 4 illustrates an embodiment in accordance with the invention in a further example. Base station 20 may have an elevated antenna 52 and serves a cell area 24 occupied by a subscriber unit receiver 22. According to the invention the base station reports its cell size to the mobile unit 22, including a measure of size and cell coordinates. This localizes receiver 22 to cell area 24. By obtaining compass bearing information, the zone 40 occupied by the receiver is localized to an angular sector 56, which encompasses an angle ● that includes the tolerance error in the bearing. The bearing information can also localize to a down bearing angle ● that with its tolerance error translates into a perimeter around zone 40. Having obtained this coarse localization, the receiver may be capable of obtaining a more accurate bearing, for example using time of arrival differences in signals from one or more satellites 32. However, the receiver 22 may not need to invoke the accuracy and computational need to resolve a complete fix of its position using the satellite system, if the application does not require greater accuracy than already provided by the combined coarse localization determinations that have at least limited the possible locations of the receiver to a particular zone 40.

For a location finding application that operates only from the same infrastructure that supports communications, e.g., using the base station 20 alone, the accuracy or resolution of the receiver or subscriber location information available is normally proportional to the cell size and is greater with greater distance from the base station 20. For example, the receiver may have a directional antenna such that the bearing of the base station can be determined, and can discriminate distance based on signal strength or the like to determine the receiver's location. The tolerance or location error in that case increases with distance from the base station, resulting in a larger resolved zone 40 than if a similar fix was taken nearer to the base station.

The area occupied by the mobile unit (its "zone") can be defined in part by the tolerance or accuracy of a location determined by the receiver from available signals from the base station and/or a location transmitter that can be within the cell or external to the cell or to the communication system generally. Location may have been resolved by the receiver in one, two or three dimensions, i.e., as residing along a line, in a plane or at a point. The error inherent in resolving the location can be considered to define space adjacent to the line or plane, or a volume around the point, and defines a zone that the receiver occupies.

Similarly, by relying on location determination technology, it is possible for a receiver to resolve its position to certain coordinates. However, it is advantageous not to rely only on a coordinate location derived or resolved in this way. There is an associated dimensional error based on the locating technology used. The receiver is known to occupy some point within a zone of error or tolerance around its resolved location. However the receiver advantageously needs access to information that determines the size of this zone.

Receivers or subscriber units may be able to support multiple location finding technologies. For example, base station coordinates, measured bearing information and/or signal strength information may be available. The receivers may alternatively or additionally employ technologies like angle of arrival (AOA) in one or two planes, enhanced observed time difference (EOTD) or GPS assist. Depending on the type of location application being attempted, the subscriber unit may be programmed to choose which of two or more technologies to use for a particular application. An application advantageously chooses a location technology that provides the resolution required, and should choose the least demanding technology that suffices for the need. In this way the receiver places minimum demands on bandwidth, battery power, processing power, processing time and other resources.

The located area or zone resolved for the device can be compared to location information available in memory, or obtained as the result of other communications, or perhaps information known to the user of the device or even from observations made by the user. For a mapping application, for example, the resolved location is compared to information from a map database and possibly plotted on a graphic representation. For an address or route guidance application, the resolved information can be compared to a database that associates routes or addresses with locations. For retrieving information applicable to a particular place such as a city or subdivision, the location information needs to be compared to available information to determine whether the location resolved for the receiver coincides with the information available respecting particular cities or subdivisions. It is unnecessary to resolve the location of the receiver to the most accurate and precise location coordinates that might possibly be obtained if the mobile device took full advantage of all available location determining resources. The applications program in the mobile device can compare the location resolution called for by the application versus the location resolution that is possible by one method or another, and rely on a location definition that is coarse or fine as needed. Low level or coarse location resolutions can replace or supplement the operation of higher precision location methods. The performance of certain Assisted GPS technologies (such as defined in TR45.5's IS-801) can be enhanced or at a minimum their solutions can be verified, when appropriate cell sizing information is provided to the subscriber unit based on knowledge of cell size and location.

In a practical case, according to cellular systems now in use, the identification number of the cell with which a subscriber unit is communicating is reported to the subscriber unit (see SID/NID: IS95, MC/NCC: GSM). This information may include the latitude/longitude (LAT/LONG) coordinates of the cell of origin (COO), or the coordinates can be obtained in a lookup table. This coordinate information is efficiently used to establish a communications path over a direct line. CDMA IS-95 allows the LAT/LONG of the cell to be broadcast on the paging channel via the "Systems Parameters Message." In known systems, the subscriber units do not know anything about the size of the cell. It is an aspect of the present invention that by reporting the cell size to the subscriber unit, the subscriber unit obtains a method for coarse subscriber location from the "size of the cell" and a reference location such as the base station coordinates. The "size of the cell" and "cell/sector bearing" (if determination can be made) permit further resolution, and full or partial access to alternative location information defines the invention with further precision or assurance.

In IS-801, messages can be provided for "Provide GPS Location Assistance—Spherical Coordinates," and "Provide GPS Location Assistance—Cartesian Coordinates." Each requests a one way delay time of arrival (TOA) from the base transceiver system (BTS). IS-801 allows this field to be left blank. These or similar functions can be used according to the invention for a portion of the location information used according to the invention. According to the present GSM, IS95/IS2000 (IS801) conventions, no information useful in obtaining or refining the size, shape or boundaries of cells or other zones occupied or bearing or width of antenna beams has been provided to the user apparatus.

A coarse location window can narrow the uncertainty of a GPS correlator search window. A coarse location estimate is convertible mathematically (using the speed of light) to an estimate of the one way delay time of arrival (TOA) from a particular signal source. The estimate may allow the subscriber unit to select among two or more potential location solutions that are reached using all or only part of the capabilities of other location technologies.

If a coarse location determination is found to provide a relatively small footprint (resolved zone definition), such as a small cell size, the subscriber unit can be caused to utilize the GPS code phase, azimuth and Doppler information as given quantities. Larger cell size (or coarse location) footprints may require interpolation of the GPS information as propagated over the cell size footprint. The cell size information can also be used as a means to double check and verify that a detected one way signal delay to the subscriber unit from position determination equipment (PDE) in an IS-801 infrastructure is valid. IS-801 contains no other practical means by which a subscriber or a PDE verify that a resolved estimated location is in fact correct. Cell size and bearing parameters can advantageously be appended to the cell identification information. Alternatively such information can define a new message content in IS-801 "Provide Base Station Almanac" or GSM RRLP.

According to another practical example, one or more concentric zones are defined relative to one or more transmission devices (base stations or subscriber units) by transmission power level distinctions. A zone defined by power level can be specific on a per-subscriber-unit basis (by downlink and by uplink). The zone based on power control need not be symmetrical (although that is a possibility) and can be, for example, a generally elliptical similar region modified by bearing or angular sector information. The base station sector and the mobile station power unit can separately define zones that are known to apply to the mobile unit, placing the mobile unit at a refined zone that is smaller than either the sector or power threshold annulus taken alone. The error or tolerance of the angular bearing and the power threshold determinations can define error level zones or can be interpreted in a probability manner as defining a likely position of the mobile station and progressively less-likely positions out to the edges of the determined Boolean-combination zone. At the least, the outer edges define a zone in which the mobile station "must" be located.

In the example of zones defined by power level, intersecting mobile unit zones can be determined to any number of increments, depending on the resolution with which transmission power is determined. Two mobile units might be located at the same location. Given an angular bearing from one or two base stations serving the mobile units, the zones are further defined. One or another of the mobile units might support a GSM-pilot or BCCH non-traffic bearing resource, defining a logical parameter that could refine the zones further. Additional zone definitions can relate to the frequencies and power levels of the two mobile units, which can be different. Thus, for example, cell area, sector beta (plus or minus tolerance), frequency and power level used, and/or a similar selection of attributes, can distinguish a zone applicable to a specific mobile unit, which zone has been refined with respect to its size or footprint to a potentially very useful level of detail.

The particular receiver preferably can select among two or more such sources when they are available, each having one of known location, bearing, zone size and/or power level. The particular receiver then selects an optimum one of the sources to determine the zone of the particular receiver, or else makes a Boolean combination of zones resolved by or for the sources to refine its location.

As noted above, the cell size can be defined in terms of specific perimeters or apex points, or by a distance from a predetermined point, or by other similar techniques. Thus the cell size could be the exact radius of the cell in meters and can be measured or reported as a data value from the base station parameters to the subscriber units. This radius can be with respect to a defined point, for example in the case of a radius from a centrally placed base station. Alternatively the cell size can be reported in terms of a cell size (e.g., a cell average diameter) without a corresponding center, in which case a subscriber unit that logically can locate itself as occupying a cell, can also reasonably assume that all other points in the cell are within one diameter's distance. Whereas the cell can be defined by specific units of measurement (e.g., meters, kilometers, miles, etc.), the cell can also be defined using general categories that are known in the programming of the subscriber unit as having a particular size or perhaps a relative size in comparison to other cells as defined by a categorization or hierarchy of cell sizes (e.g., Macro cell, Regular cell, Pico cell, femto cell, etc.).

The available angular information provided, for example, by the appropriate base station that can assist in location resolution may include the cell/sector bearing, down-tilt, and horizontal antenna pattern beam width. This angular information is useful, for example, together with timing information to resolve or estimate a location. For example, such angular information can be used in conjunction with amplitude difference angle-of-arrival estimation as described in U.S. Pat. No. 5,786,791—Bruckert. Angular information is potentially useful with or without the added resolution provided by timing information. Even information such as single bearing angular information, which may be useful to resolve a general location or perhaps to eliminate some portions of a cell from consideration as the zone occupied by the subscriber terminal, can be exploited to gain information or to better guide the selection of information from other sources. For example, a coarse location definition can refine the necessary steps to obtain a finer location definition as a battery efficiency method for subscriber units in a large cell setting. Preferably, beam width description parameters can be added to expand existing base station information transmitted from base stations, for example as a supplement or improvement in the IS-801 standards. Specifically, information can be added as shown in the following Table I.

TABLE I

| Cell ID (10 digits) | Cell size | Transmitted message |
| --- | --- | --- |
| 1011101001 | In hundreds of meters, e.g. 5 kms – 50 × 100 represented by 7 digits (1100110) | 1011101001 1100110 |
| 1110010100 | Large (000) | 1110010100 000 |
| 0100011110 | Regular (001) | 0100011110 001 |
| 1100011010 | Micro (010) | 1100011010 010 |
| 1010101010 | Pico (011) | 1010101010 011 |
| 1011111110 | Femto (100) | 1011111110 100 |

The cell size may be provided to the subscriber unit efficiently by modifying or supplementing cell identification numbers according to a rule that causes information about the cell size to be transmitted as a part of the selected cell identification code. In the embodiment illustrated by Table I, up to 128 different sizes representing incremental distances can be represented by seven bits, or up to eight hierarchical size categories can be represented by three bits, appended to the cell identification code. In the hierarchy of eight categories, for example, the sizes can be defined as provided by Table II to represent predetermined dimensions that are considered in executing the programming of the subscriber units.

TABLE II

| 000 Very large | (size > 20 km) | Cellular Rural |
| 001 Large | (10 kms < size < 20 km) | Cellular suburban |
| 010 Medium | (5 kms < size < 10 km) | Cellular town |
| 011 Medium | (2.5 kms < size < 5 km) | Cellular large town |
| 100 Medium Small | (1 km < size < 2.5 km) | Cellular city |
| 101 Small | (100 m < size < 1 km) | Large city/indoor |
| 110 Microcell | (50 m < size < 100 m) | Large city/indoor |
| 111 Pico cell | (10 m < size < 50 m) | Personal Area network |

When the system engineer assigns an ID number to a given cell, the cell size is classified based on the resolution in Table II. The least significant bits of the cell ID number correspond to the selected size from the table. This method of cell size/ID mapping has the advantage of using a communication channel efficiently to convey information that is available to location specific applications.

According to a further inventive aspect, the transmitted cell size, by hierarchy or otherwise, can be further generalized to include other useful information regarding the serving cell, which are usefully made known for access to the programmed operations operating in the subscriber units for location specific functions as well as functions that are specific to a logical status of the subscriber unit or of all subscriber units in the cell. This information may advantageously include parameters such as transmitter power, cell environment (e.g., urban/rural, indoor/outdoor, office/commercial/recreational), traffic at the serving site, etc., whether in a broadcast or point to point information transfer mode, and other parameters. With access to this information the programming of the subscriber unit can make efficient decisions as to information presented to the user or otherwise used in effecting its operations.

Assuming, for example, that a user is employing a mobile receiver in an effort to guide the user to a particular building in a city, the receiver may obtain information wholly or partly from its cell identification code localizes the receiver to a zone that is approximately one city block in length. If the subscriber unit then determines that its destination resides within a city block of the cell coordinates, there is no point in accessing other location information to improve the resolution of the location fix. The user is already in the immediate vicinity of the destination.

In another example, the receiver may determine from the cell identification information that the cell size some miles in diameter but by an angular bearing with the base station can localize itself to an angular sector having a known radial and angular dimension. This enables the receiver to selectively access database information that lists commercial or other establishments of a selected type, that are within the same angular sector. With the addition of angle of arrival, time of arrival or similar location information, the receiver can further refine its location fix as needed for the particular selection of information undertaken.

In general, according to an aspect of the invention, a communication network is improved by providing mobile units with a measure of the dimensions of a predetermined area, which the mobile unit is known to occupy. This can be accomplished by directly reporting cell size information together with cell identification information or by using one or more other techniques that cause the universe of potential locations to be divided into spatial as well as logical subsets of the universe. Where a subscriber unit can determine its membership in overlapping subsets of spatial areas, the available intelligence is that much more effective in localizing the user to a particular zone. As a result, the subscriber units can more effectively process location specific information with reduced reliance on demanding processing and expensive infrastructure.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method in a mobile wireless communication handset, comprising:
   receiving base station location information of a cellular communication base station;
   receiving base station cellular area information for the cellular communication base station for which the base station location information is received;
   receiving a bearing and bearing angular width information for the cellular communication base station;
   determining, at the mobile wireless communication handset, a coarse location of the mobile wireless communication handset based on the base station location information, the base station cellular area information, the bearing and the bearing angular width information, and on the cellular area information.

2. The method of claim 1, determining a refined location of the mobile wireless communication handset based on the coarse location.

3. The method of claim 1, the mobile wireless communication handset is a global positioning system (GPS) enabled mobile wireless communication handset, determining a GPS based location of the mobile wireless communication handset, reducing a GPS search space with the coarse location when determining the GPS based location of the mobile wireless communication handset.

4. The method of claim 1, measuring power of a signal transmitted by the cellular communication base station, determining the coarse location of the mobile wireless communication handset based on the base station location information, the base station cellular area information, the bearing and the bearing angular width information, and the power measurement.

5. A method in a cellular communication system comprising a network of cellular base stations, the method comprising:
   transmitting base station location information from at least one cellular base station;
   transmitting a cellular area of the at least one cellular base station for which the base station location information is transmitted;
   transmitting, from the network, bearing information of the base station;
   transmitting bearing angular width information for the cellular base station;
   determining the coarse location of the mobile wireless communication device in the network based upon the base station location information, the cellular area of the corresponding cellular base station, and the bearing and the bearing angular width information.

6. The method of claim 5, determining a coarse location of a mobile wireless communication device in the network based upon the base station location information, the cellular area, and the bearing information of the at least one cellular base station.

7. The method of claim 5, measuring power of a signal from the cellular base station, determining the coarse location of the mobile wireless communication device in the network based upon the base station location information, the cellular area of corresponding cellular base station, the bearing information, and the power measurement.

8. The method of claim 5, transmitting the base station location information, the cellular area, and the bearing information in a Provide Base Station Almanac Message.

9. The method of claim 5, transmitting the base station location information, the cellular area, and the bearing information in a common message.

* * * * *